United States Patent [19]

Pitts

[11] 4,200,618
[45] Apr. 29, 1980

[54] PREPARATION OF MAGNESIUM CHLORIDE

[75] Inventor: Frank Pitts, Magalas, France

[73] Assignee: Engelhard Minerals & Chemicals Corporation, Edison, N.J.

[21] Appl. No.: 15,768

[22] Filed: Feb. 28, 1979

[51] Int. Cl.$^2$ ............................................. C01F 5/30
[52] U.S. Cl. ..................................... 423/163; 423/497
[58] Field of Search ..................... 423/50, 55, 65, 66, 423/84, 122, 127, 129, 140, 164, 165, 497, 163

[56] References Cited

U.S. PATENT DOCUMENTS

| | | | |
|---|---|---|---|
| 2,384,009 | 9/1945 | Brandenburg | 423/163 |
| 3,479,135 | 11/1969 | Pray et al. | 423/497 |

*Primary Examiner*—O. R. Vertiz
*Assistant Examiner*—Wayne A. Langel
*Attorney, Agent, or Firm*—Inez L. Moselle

[57] ABSTRACT

An improved method of preparing magnesium chloride in which magnesium oxide, hydroxide or carbonate or a material containing magnesium oxide is caused to react with waste chlorides produced in the manufacture of titanium tetrachloride and the solution of magnesium chloride so formed is separated from insoluble matter.

11 Claims, No Drawings

PREPARATION OF MAGNESIUM CHLORIDE

FIELD OF THE INVENTION

The present invention relates to the manufacture of magnesium chloride using material, normally disposed of as a waste, as the source of chloride anions. More particularly, the invention relates to the manufacture of magnesium chloride from "fuming solids" arising from the chloride process for manufacturing titanium tretrachloride.

Magnesium chloride occurs naturally in sea water and well brines but it is always associated with other chlorides such as those of sodium and potassium. No simple commercial process has been developed for directly recovering pure magnesium chloride from such sources. It is necessary to first recover the magnesium as hydroxide or carbonate and then to react the magnesium compound with hydrochloride acid. At the present time the cost of hydrochloric acid represents more than one-half the raw material costs in producing magnesium chloride.

In the manufacture of titanium tetrachloride by chlorination of a mixture of carbon and a titaniferous mineral at elevated temperature, undesirable impurities are separated from the titanium tetrachloride. This separated material comprises the chlorides and/or oxychlorides of iron, aluminum, chromium, manganese, vanadium, zirconium, columbium and tantalum together with titanium chloride, carbon and unreacted titaniferous mineral. Such material, generally referred to as "fuming solids", is disposed of as a waste. Usually the disposal involves mixing the fuming solids with water, thereby producing a strongly acidic solution of the metal chlorides in which carbon and titaniferous minerals are suspended. The slurry is then reacted with lime or calcium carbonate to form a neutral or alkaline slurry comprising carbon, titaniferous mineral and the hydroxides of the metals originally contained in the fuming solids. The slurry is then disposed of as a waste material, sometimes after separating the insoluble material by filtration or sedimentation. In any case, neither the solid material nor the solution has any commercial value. To the best of my knowledge residues from the chloride process have never been used as a raw material in the manufacture of magnesium chloride.

It is an objective of my invention to provide an improved process for the manufacture of magnesium chloride in which the need for expensive hydrochloric acid is obviated and the chloride ions are supplied by a waste material of no commercial value.

It is a further objective of this invention to provide an economically viable process whereby environmentally objectionable waste materials arising in the manufacture of titanium tetrachloride can be converted into a useful commercial product.

THE INVENTION

Briefly stated, the essence of this invention resides in causing a basic magnesium-containing material selected from the group consisting of magnesium oxide, magnesium hydroxide, magnesium carbonate, calcined breunnerite or mixtures thereof to react with an aqueous solution of the acidic chlorides arising in the manufacture of titanium tetrachloride until the pH of the reaction mass is at least 5.5, and preferably is between 6 and 7.5, separating insoluble matter from the solution of magnesium chloride so formed by any conventional solid-liquid separation process, such as filtration, and recovering the solution of magnesium chloride which may be sold as such or, after evaporation and crystallization, as magnesium chloride hexahydrate.

The solution of waste chlorides, which comprises the chlorides (and/or oxychlorides) of iron, aluminum, chromium, manganese, vanadium, zirconium, columbium, tantalum and titanium, usually also contains in suspension unreacted carbon and titaniferous mineral which are in most cases present in the waste chlorides obtained in the titanium tetrachloride process. In some cases it may be desirable first to separate the insoluble carbon and titaniferous mineral from the aqueous chloride by means such as filtration and subsequently to react the chloride solution so obtained with the basic magnesium compound.

In one preferred embodiment of the invention the basic magnesium-containing material is also a material normally disposed of as waste. More particularly, the source of magnesium is tailings arising from the beneficiation of a talc ore by means such as flotation. The tailings contain breunnerite (mixed iron-magnesium carbonate). To place the tailings in a form suitable for use in practice of this invention, the tailings are dried and then calcined to expel all or substantially all of the carbon dioxide.

PREFERRED EMBODIMENTS

Waste metal chlorides containing carbon and titaniferous mineral, arising in the manufacture of titanium tetrachloride, are mixed with water to produce a slurry comprising a suspension of solid carbon and titaniferous mineral in a solution of the chlorides of iron, aluminum, chromium, manganese, vanadium, zirconium, columbium, tantalum and titanium. This slurry, which will have a pH less than about 1.0, is stirred and at least one basic magnesium compound, such as magnesium hydroxide, is gradually added while continually stirring until the pH increases to a value of at least 5.5 preferably between 6 and 7.5, and mostly preferably between 6 and 7, whereby all the metals other than magnesium are precipitated as hydroxides, hydrated oxides or insoluble magnesium compounds, and a solution of magnesium chloride, substantially free of noxious metals such as chromium and vanadium, is formed. The insoluble material is separated by filtration and the filter cake is washed with water to extract substantially all of the residual magnesium chloride.

Preferably the filtrate and washings are recovered separately and the washings, comprising a dilute solution of magnesium chloride, are recycled in the process, being used to replace some or all of the water used to form the slurry of the waste chlorides.

The magnesium chloride solution produced as a filtrate may be sold as such or it may be concentrated by evaporation until it contains a higher concentration of the chloride, for example 30 to 35% $MgCl_2$. Alternatively, the filtrate may be further concentrated until its composition corresponds with that of the hexahydrate $MgCl_2.6H_2O$, which may be solidified as such or converted to flake form by passing the hot liquid over water-cooled flaking rolls.

In the most preferred embodiment of the invention a material containing calcined breunnerite is used as the basic magnesium compound. In the mineral beneficiation of talc, tailings arise which are composed of talc, breunnerite, pyrrhotite, gersdorffite, pyrite, cobaltite and smalite. Normally these tails are a waste material and they create a disposal problem. Instead of impounding or discarding such tails, they are dried and calcined at a temperature in the range of about 1000° F. to 1800° F., preferably about 1100° to 1500° F., to expel most of the carbon dioxide and to produce the desired material containing calcined breunnerite. In using this material in the process of the invention, only the magnesium oxide contained in the calcined breunnerite-containing material reacts to form a soluble salt and all the other constituents, in the calcined breunnerite, such as talc, iron oxide and silica, remain insoluble and are separated by filtration along with the carbon, titaniferous mineral and metal hydroxides.

The following examples are given for illustrative purposes and are not considered to be limiting the invention to the specific materials and procedures described therein.

EXAMPLE I

Waste material composed of metal chlorides, rutile, and carbon from a titanium tetrachloride plant was stirred with water, producing a strongly acidic slurry containing about 80 wt. % water. The slurry was analyzed and found to contain:

|  | Cl | Fe | Al | Cr | V | Zr | Nb | Ta | Ti | C |
|---|---|---|---|---|---|---|---|---|---|---|
| % by weight | 5.1 | 0.6 | 0.2 | 0.1 | 0.2 | 0.2 | 0.2 | 0.01 | 3.1 | 8.0 |

A 2200 ml. portion of the slurry was placed in a beaker and continually stirred while powdered magnesium hydroxide was gradually added until pH was 7.0. During the addition, the slurry was heated to increase the temperature to 75° C. The total amount of magnesium hydroxide incorporated was 163 grams. The slurry was filtered and 1666 ml. of filtrate analyzing 68 grams per liter of $MgCl_2$ was obtained. The filtrate analyzed less than 2 ppm of vanadium and less than 10 ppm of total heavy metals. The filter cake was washed with 2000 ml. of water. The volume of the washings recovered was 1920 ml. and they were found to contain 29 grams per liter of $MgCl_2$, less than 2 ppm of vanadium and less than 10 ppm of total heavy metals.

This example therefore illustrates that relatively high purity magnesium chloride was produced from titanium tetrachloride wastes, utilizing the chloride content of the wastes as the source of chloride ions in the recovered magnesium chloride.

EXAMPLE II

In this example another portion of the slurry used in the previous example was first filtered to remove insoluble material. The filtrate was analyzed and was found to contain:

|  | Cl | Fe | Al | Cr | V | Zr | Nb | Ta | Ti |
|---|---|---|---|---|---|---|---|---|---|
| % by weight | 7.8 | 0.9 | 0.3 | 0.2 | 0.3 | 0.3 | 0.3 | 0.02 | 0.5 |

One hundred and ten (110) ml. of this filtrate was placed in a beaker and stirred while adding gradually finely divided calcined breunnerite material until the pH of the mass reached 6.5. The calcined breunnerite material was obtained by calcining tailings obtained from the mineral beneficiation of talc for 30 minutes at 1500° F. The total weight of calcined breunnerite-containing tailings added to the slurry of chloride residues was about 24 grams. The composition of the calcined tailings was approximately:

|  | MgO | $Fe_2O_3$ | $SiO_2$ | $Al_2O_3$ | CaO | Ni | As |
|---|---|---|---|---|---|---|---|
| % by weight | 58.8 | 14.7 | 12.7 | 2.6 | 1.7 | 0.3 | 0.1 |

After pH of the waste chloride slurry reached 6.5, the slurry was filtered. The total volume of the filtrate was 60 ml. The concentration of $MgCl_2$ in the filtrate was 102 grams/liter. It was found to contain less than 2 ppm of vanadium, less than 2 ppm of arsenic and less than 10 ppm of total heavy metals.

This example thus demonstrates that relatively high purity magnesium chloride can be produced by reacting two materials both normally considered to be wastes, namely tailings obtained in talc flotation and residues of titanium tetrachloride manufacture.

Although the invention has been described with particular reference to certain preferred embodiments thereof, variations and modifications may be effected within the spirit and scope of the invention as described hereinabove and as defined in the appended claims.

I claim:

1. A process for the manufacture of magnesium chloride which comprises (a) providing waste acidic chloride residues produced in the manufacture of titanium tetrachloride by the chloride process, (b) forming said waste chlorides into an aqueous slurry by adding water thereto, (c) gradually adding to said slurry a magnesium-containing material selected from the group consisting of magnesium oxide, magnesium hydroxide, magnesium carbonate, calcined breunnerite and mixtures thereof until the pH of the slurry is at least 5.5, (d) separating insoluble matter from the resulting aqueous solution of magnesium chloride and (e) recovering said solution of magnesium chloride.

2. The process of claim 1 wherein the insolubles remaining after separation from said solution of magnesium chloride in step (d) are washed with water to extract substantially all of the residual magnesium chloride, forming a dilute solution of magnesium chloride and recovering said dilute solution of magnesium chloride.

3. The process of claim 2 wherein said dilute solution of recovered magnesium chloride is recycled and used to replace at least part of the water used to form said slurry in step (b).

4. The process of claim 1 wherein said magnesium-containing material is added in step (b) until pH is between 6 and 7.5.

5. The process of claim 1 wherein the slurry formed in step (b) is filtered and filtered solids are removed before step (c).

6. The process of claim 1 wherein said magnesium-containing material is obtained by providing tailings of talc beneficiation, said tailings containing breunnerite, and drying and calcining said tailings to expel most of the carbon dioxide contained therein.

7. A process for the manufacture of magnesium chloride from waste chloride residues obtained in the manufacture of titanium tetrachloride by the chloride process, said residues comprising chlorides or oxychlorides of iron, aluminum, manganese, vanadium, zirconium, columbium, tantalum and titanium, which comprises mixing said residues with water to form a suspension of chlorides or oxychlorides having a pH below 1, gradually adding to said suspension a basic magnesium material obtained by drying and calcining talc beneficiation tailings that contain breunnerite at a temperature in the range of about 1000° to 1800° F. to expel most of the carbon dioxide, until pH is within the range of 6 to 7.5, separating insolubles from the resulting aqueous solution of magnesium chloride, separately recovering a concentrated solution of magnesium chloride and said insolubles, washing said insolubles with water to recover a dilute solution of magnesium chloride and recycling said dilute solution to the process by utilizing it to replace all or a part of the water mixed with said residues to form said suspension of chlorides or oxychlorides.

8. The process of claim 7 wherein said recovered concentrated solution of magnesium chloride is evaporated to crystallize magnesium chloride hexahydrate.

9. The process of claim 7 wherein a mixture of magnesium hydroxide and said calcined breunnerite is added to said slurry to bring pH to said value in the range of 6 to 7.5.

10. A process for the manufacture of magnesium chloride from waste chloride residues obtained in the manufacture of titanium tetrachloride by the chloride process, said residues comprising chlorides or oxychlorides of iron, aluminum, manganese, vanadium, zirconium, columbium, tantalum and titanium which comprises mixing said residues with water to form a suspension of chlorides or oxychlorides having a pH below 1, gradually adding magnesium hydroxide with mixing until pH is within the range of 6 to 7.5, separating insolubles from the resulting aqueous solution of magnesium chloride, separately recovering a concentrated solution of magnesium chloride and said insolubles, washing said insolubles with water to recover a dilute solution of magnesium chloride and recycling said dilute solution to the process by utilizing it to replace all or a part of the water mixed with said residues to form said suspension of chlorides or oxychlorides.

11. The process of claim 10 wherein said recovered concentrated solution of magnesium chloride is evaporated to crystallize magnesium chloride hexahydrate.

* * * * *